(12) United States Patent
Nixon et al.

(10) Patent No.: US 8,811,199 B2
(45) Date of Patent: Aug. 19, 2014

(54) LOCATION DETECTION IN A WIRELESS NETWORK

(75) Inventors: Mark Nixon, Round Rock, TX (US); Robert Karschnia, Chaska, MN (US); Eric Rotvold, West St. Paul, MN (US); Trevor Duncan Schleiss, Austin, TX (US); Deji Chen, Round Rock, TX (US)

(73) Assignee: Rosemount Inc., Bloomington, MN (US)

( * ) Notice: Subject to any disclaimer, the term of this patent is extended or adjusted under 35 U.S.C. 154(b) by 1072 days.

(21) Appl. No.: 12/614,127

(22) Filed: Nov. 6, 2009

(65) Prior Publication Data

US 2011/0110242 A1   May 12, 2011

(51) Int. Cl.
    *H04L 12/26* (2006.01)
(52) U.S. Cl.
    USPC ........... 370/252; 370/204; 370/264; 370/490; 370/487; 370/400
(58) Field of Classification Search
    USPC ............... 370/204, 264, 490, 487, 334, 400; 375/260, 267; 455/422, 426, 427, 456, 455/457
    See application file for complete search history.

(56) References Cited

U.S. PATENT DOCUMENTS

| | | | |
|---|---|---|---|
| 5,721,819 A | 2/1998 | Galles et al. | |
| 5,977,913 A | 11/1999 | Christ | |
| 6,266,625 B1 * | 7/2001 | Johnson | 702/89 |
| 6,456,239 B1 | 9/2002 | Werb et al. | |
| 6,674,403 B2 | 1/2004 | Gray et al. | |
| 7,269,138 B2 | 9/2007 | Huang et al. | |
| 7,362,724 B2 | 4/2008 | Huang et al. | |
| 2005/0013394 A1 * | 1/2005 | Rausch et al. | 375/356 |
| 2005/0058081 A1 * | 3/2005 | Elliott | 370/252 |
| 2006/0025154 A1 * | 2/2006 | Alapuranen et al. | 455/456.1 |
| 2006/0133387 A1 | 6/2006 | Pekhteryev et al. | |
| 2006/0193262 A1 | 8/2006 | McSheffrey et al. | |
| 2007/0060098 A1 | 3/2007 | McCoy | |

(Continued)

FOREIGN PATENT DOCUMENTS

| KR | 10-2009-007406 A | 7/2009 |
|---|---|---|
| WO | WO9919742 | 4/1999 |

OTHER PUBLICATIONS

Cambridge Consultants, Zonal Location and Asset Tracking With Zigbee Technology (using RSSI), 1-25, Oct. 12, 2006.

(Continued)

*Primary Examiner* — Huy D Vu
*Assistant Examiner* — Zewdu A Beyen
(74) *Attorney, Agent, or Firm* — Kinney & Lange, P.A.

(57) ABSTRACT

A first node sends a first message to a second node. The second node sends a second message to the first node. A first elapsed time is measured from the beginning of the transmission of the first message to the beginning of receipt of the second message. A second elapsed time is measured from the beginning of the receipt of the first message to the beginning of the transmission of the second message. The second node sends a third message to the first node containing the second elapsed time. The distance between the first and second node is calculated based on these elapsed times and a calibration count multiplier contained in the second or third message. A node may be moved within a wireless mesh network. Positional information about the node and distances to its neighbors is determined and transmitted to the network manager where it is stored.

33 Claims, 4 Drawing Sheets

(56) References Cited

U.S. PATENT DOCUMENTS

| | | | |
|---|---|---|---|
| 2007/0061041 A1 | 3/2007 | Zweig | |
| 2007/0155401 A1 | 7/2007 | Ward et al. | |
| 2007/0184852 A1 | 8/2007 | Johnson et al. | |
| 2007/0257831 A1 | 11/2007 | Mathews et al. | |
| 2008/0231513 A2* | 9/2008 | Torimoto et al. | 342/453 |
| 2008/0258973 A1* | 10/2008 | Heidari-Bateni et al. | 342/387 |

OTHER PUBLICATIONS

Dust Networks, Technical Overview of Time Synchronized Mesh Protocol (TSMP), 1-18.

Helicomm, Helicomm to Demonstrate ZigBee Wireless Sensor Monitoring and Location Tracking Platform, http://helicomm.com/newindex.php?page=13-15&id=88&PHPSESSID=..., visited Jun. 27, 2008.

Internet Infrastructure Zone, "Location Tracking and RFID," http://www.infrastructure.ziffdavisenterprisecom/c/a/Blogs/Location-Tracking-and-RFID, visited Jun. 27, 2008.

Zhu, Xiuming et al., "A location-determination application in wirelessHART," Aug. 25, 2009.

The Jun. 21, 2011 International Search Report for International Application No. PCT/US2010/002894.

* cited by examiner

LOCATION DETECTION IN A WIRELESS NETWORK

BACKGROUND

The present invention relates generally to location detection in wireless networks and, more particularly, to location detection in wireless mesh networks installed in an industrial setting.

The combination of technology advances in wireless technology, low power microprocessors, integrated circuits, measurement and control techniques, and energy storage has enabled the development of low-cost, low power devices. Networking wireless devices together into a sensor network that is able to meet the reliability, latency, real-time, and performance requirements of process automation applications, while at the same time taking into consideration the practical limits on available resources is a challenging task. Wireless signal strength varies in time, and wireless nodes come and go. Data is routed dynamically on different paths, and batteries have a finite amount of energy. To meet these demands, network management techniques must be able to form the overall network topology using information reported by the devices and the network itself and then schedule and optimize the overall network for latency, power, and throughput.

Managing latency while at the same time conserving power is a problem facing wireless sensor networks today. To minimize latency, communications need to be organized so that packets are not delayed en-route from source to destination. In the industrial setting, low power nodes must operate for long periods of time, usually many years, often unattended. To minimize energy usage devices should be kept in a low-power mode as much as possible.

At the communication distances typical in sensor networks, listening for information on the radio channel consumes approximately the same amount of power as data transmission. Further, the energy consumption of an idle device is approximately the same as that of a device in receive mode. As a result, the most effective way to save power is to turn the radio and the device itself off during idle times. Turning the device off implies advance knowledge about when the device will be idle and when it should power back on. The approach taken in some industrial sensor network protocols, such as WirelessHART, is to configure the device with knowledge about when it should wake up, perform some function, and go back to sleep. This configuration is performed by a network manager and is called time scheduling.

One approach to address this is with the use of time synchronized wireless technologies such as Time Division Multiple Access (TDMA) utilized by WirelessHART. WirelessHART is a secure networking technology operating on the 2.4 GHz ISM radio band utilizing IEEE 802.15.4 compatible direct-sequence spread spectrum (DSSS) radios with channel hopping on a packet by packet basis.

Scheduling is performed by a centralized network manager which uses overall network routing information in combination with communication requirements that devices and applications have provided. The schedule is subdivided into slots and transferred from the network manager to individual devices. Devices are only provided with the slots for which they have transmit or receive requirements. The network manager continuously adapts the overall network graph and network schedule to changes in network topology and communication demand.

The network manager also initializes and maintains network communication parameter values. It provides mechanisms for joining and leaving the network as well as managing dedicated and shared network resources. Additionally, the network manager is responsible for collecting and maintaining diagnostics about the overall health of the network and reporting to host-based applications.

A feature that is desirable in industrial sensor networks is the ability to track people and assets on the plant floor and subsequently the capability of detecting intruders. Previous methods for implementing location detection required the installation of various sensors, beacons, and detectors along with a separate infrastructure to carry out the location detection and reporting. These systems are often too expensive to implement separately which results in sensor network systems that do not include location information. A method to use an existing wireless sensor network infrastructure for location detection is needed.

SUMMARY

One embodiment of the present invention includes measuring a calibration count multiplier by a first node and a second calibration count multiplier by a second node. A message is transmitted by the first node and received by the second node. A second message is transmitted by the second node and received by the first node. A first elapsed time from the beginning of transmitting the first message to the beginning of receiving the second message is measured. A second elapsed time from the beginning of the receiving the first message to the beginning of transmitting the second message is also measured. A third message is transmitted by the second node and received by the first node containing the second elapsed time. The second calibration count multiplier is included in either the second or third message. The distance between the first and second node is then calculated based on the first and second elapsed times and the first and second calibration count multipliers.

In another embodiment of the present invention, a method for locating a node within a wireless mesh network is described. A node is positioned in more than one location within the network. For each location, positional information about the node is determined. Distances from other nodes installed in the wireless mesh network are measured and transmitted with the positional information about the node to a network manager. The network manager stores the distances and the positional information for each location.

DETAILED DESCRIPTION

Industrial sensor networks, particularly those utilizing a time synchronized mesh network such as WirelessHART, can be used for location detection enabling tacking of people and assets on a plant floor. In a more advanced arrangement, intruder detection can also be enabled.

Each device in the network is enhanced to include both absolute or relative positional information and algorithms to compute location based on triangulation, mapping, or other mathematical techniques. Specialized devices such as locator beacons emit a periodic beacon which is used by mobile nodes in the network such as handheld devices and location sensors attached to personnel to identify location. These nodes can include algorithms to determine location based on communications with other nodes installed in the wireless mesh network such as field devices and beaconing devices on the plant floor. Additionally, they can insert absolute or relative waypoints in field devices and beaconing devices. Devices such as a handheld have the additional ability to be moved around the plant to insert "relative" waypoint information that increases the accuracy of a node being located. The information can be fed back to a central application on a host computer such as a network manager that contains a map of the process manufacturing facility. Assets or personnel moving through the wireless mesh network are then located using the information in the host application.

Time Adjustment Field

When a message is sent between two modules, a time of flight measurement can be made and used to determine the distance between two nodes. The accuracy of the distance determination is directly related to the accuracy of the time measurement. In a wireless mesh network, one node will be transmitting and a second node receiving. Other than the wireless link, there is no connection between the two nodes. Each has its own sense of time. A global clock can be used to timestamp messages, but this method is prone to errors resulting from propagation delay and limited resolution. Nevertheless, some existing wireless mesh networks, in particular those utilizing WirelessHART, include features which can be leveraged to enable a more precise location determination without the addition of any hardware or significant changes to software.

Figure 1:
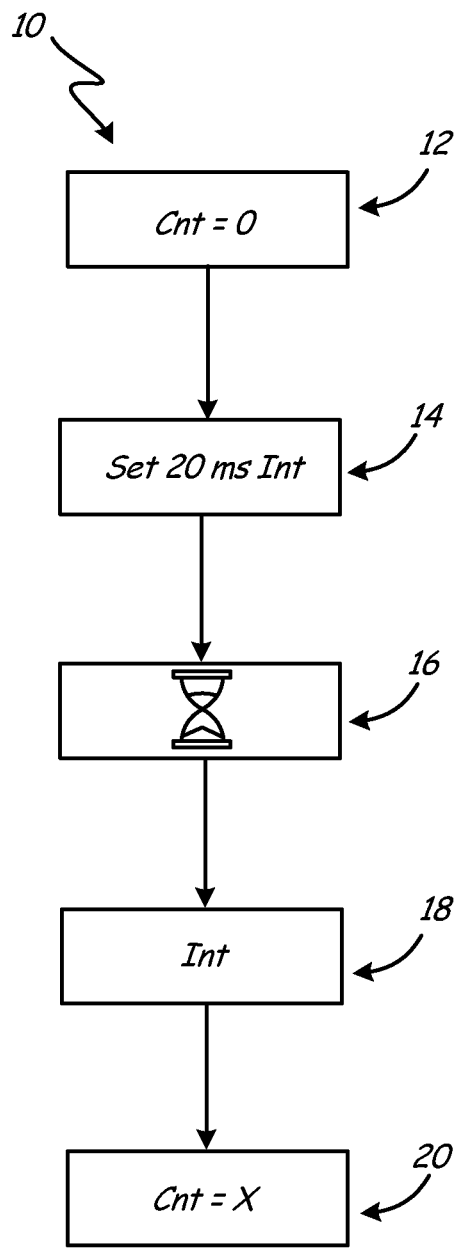
FIG. 1 is a state flow diagram showing a method for determining a calibration count multiplier.

FIG. 1 illustrates a technique for minimizing oscillator variation to improve the accuracy of network clocks. A lower speed microprocessor clock can be used to minimize the variation in the high speed oscillator. Process 10 begins by zeroing the oscillator counter at 12 and setting a 20 ms interrupt at 14. Almost any time period will work with 20 ms being a typical value used. The node then waits or processes other tasks at 16 until interrupted at 18. The count is read at 20. This value is the number of counts in a 20 ms period. As an example, the number of oscillator ticks in this period is counted. If the oscillator were nominally $1 \times 10^9$ Hz, then the ideal count would be 20,000,000. A small error, however, may yield 20,000,010 ticks. Because the microprocessor clock is more precise than the oscillator, this count value can be characterized as a calibration count multiplier and used to compare the oscillator count values of different nodes with increased resolution.

The present invention uses this calibration count multiplier to increase the accuracy of a time of flight calculation to determine the distance between two nodes. To complete this calculation, the time when a message transmission begins at one node and is received at another must be resolved. Even in a time synchronized network, minor differences in oscillator frequency can create errors in distance calculations.

Figure 2:
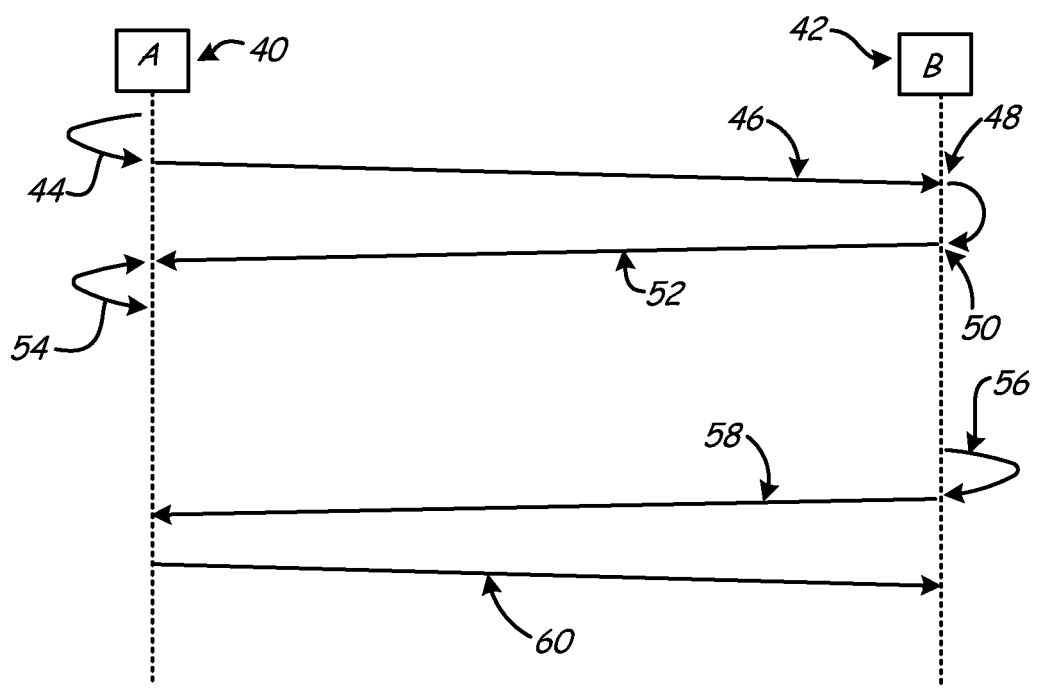
FIG. 2 is a timing diagram illustrating time of flight calculations.

FIG. 2 is a timing diagram showing timeline 40 for exemplary node A and timeline 42 for exemplary node B. Node A begins a time measurement at 44 and sends read distance command message 46 to node B. Node B begins a second time measurement at 48, the beginning of reception of read distance command message 46. At 50, node B sends acknowledgement 52 to node A and completes its time measurement at the beginning of acknowledgement 52. Upon receipt of acknowledgement 52, node A stops its time measurement at 54, the beginning of receipt of acknowledgement 52. At 56, node B generates response message 58 which contains the value of its time measurement and the calibration count multiplier for node B. If required by the network protocol, node A may additionally send acknowledgement 60 back to node B.

The elapsed time measurements can be taken using any number of techniques including timestamps and counters. To use timestamps, a beginning and ending timestamp are recorded. Often, a free running clock is used. The first timestamp is subtracted from the second timestamp to yield the elapsed time between the two timestamps. The counter method begins by initializing a counter register to 0. The counter is then free running with the system clock until it is stopped or read. The value in the register is then the elapsed time.

The resolution of the elapsed time measurements is typically the same as the period of the microprocessor clock. The faster the clock, the more accurate calculations based off of the elapsed time measurements can be. A clock frequency found on a battery operated field device yields a measurement resolution on the order of 10-20 nanoseconds, however, a 1 nanosecond period is readily achievable and will produce better results.

With the time delay in supplying the acknowledgement message known, the time of flight can now be calculated. For greater accuracy, the calibration count multipliers are used to scale the oscillator counts from each node against their calibration count multipliers for more precise time measurement.

The distance is then calculated as:

$$d = \frac{1}{2} \cdot c \cdot ((\text{node } A\text{'s time measurement scaled to node } A\text{'s calibration multiplier}) - (\text{node } B\text{'s time measurement scaled by node } B\text{'s calibration multiplier}))$$

where d is the distance between the nodes and c is the speed of light.

If, for example, the acknowledgment message is sent at approximately 5 ms and the nodes have an oscillator that is nominally $1 \times 10^9$ Hz, the following exemplary values may occur:

Node B measures 50,000,025 ticks.
Node A measures 50,000,100 ticks.
Node A has a calibration count multiplier of 20,000,010.
Node B has a calibration count multiplier of 20,000,000.

$$d = \frac{1}{2} \cdot 3 \times 10^8 \text{ meter/sec}/(1000 \text{ ms/sec}) \cdot ((50000100 \text{ tick}/(20000010/20 \text{ tick/ms})) - (50000025 \text{ tick}/(20000000/20 \text{ tick/ms}))) = 7.5 \text{ meters.}$$

Without the calibration count multiplier:

$$d = \frac{1}{2} \cdot 3 \times 10^8 \text{ meter/sec}/(1000 \text{ ms/sec}) \cdot ((50000100 \text{ tick}/(20000000/20 \text{ tick/ms})) - (50000025 \text{ tick}/(20000000/20 \text{ tick/ms}))) = 11.25 \text{ meters.}$$

The advantage of using the calibration count multiplier to reduce the variation between nodes due to slight differences in oscillator frequency clearly yields a more accurate result. By utilizing this compensation, very tight oscillator tolerances are not required to obtain accurate results which allow this technique to be used with a wider variety of nodes. With a minimum of three nodes, location in 2 dimensions can be determined and with a minimum of 4 nodes, location in 3 dimensions can be determined by using triangulation techniques.

Location Positioning in a Wireless Mesh Network

Location positioning allows the determination positional information about assets. An asset can be personnel, equipment, devices, or a number of other things. A position can be expressed as a well known descriptor such as "furnace 2", as an absolute location such as an (x,y,z) coordinate, a relative coordinate such as (x,y,z) from some waypoint, or as a combination of the preceding techniques. This positional information can be determined by a device such as a handheld, by the network nodes themselves, in a gateway, or in a backend server. The positional information can also be presented to a user as a map with a dynamic overlay showing the position of the assets. Assets themselves are associated with nodes. In the case of WirelessHART, all nodes are devices which are further classified as field devices, devices acting as routers, handhelds, gateways, the network manager, devices acting as locator beacons, and adapters. Some devices can include motion detectors to detect the presence of an object or asset that may or may not be an authorized asset.

Locator beacons can be active or passive. An active device automatically transmits location beaconing information. Passive devices respond to other devices or simply monitor communications to determine positions of other nodes.

Positioning information can be collected by establishing a secondary sub-network or combined within the principal wireless mesh network. In the case of a WirelessHART network, the positioning information can be integrated into the principal network through the use of HART commands. Nodes with positioning capability support HART commands to read and write positioning configuration, have the ability to send a beacon message, can receive a beacon message and compute location, or some combination thereof.

Nodes incorporate transmitters, receivers, sensors, landmarks, and waypoints. Waypoints and landmarks provide positional information which can be expressed in any of the ways listed above. A typical installation environment for the present invention is an industrial setting such as a plant environment. This means that smart beaconing devices will be influenced by lighting levels, electromagnetic interference, calibration error, and other sources of noise. Smarter devices can attempt to compensate for these issues.

Advanced features of the location positioning system include card/badge readers incorporated into a higher level system to further assist in tracking assets. When personnel badge into an area or activates and RFID reader, the location is relayed back to a central server containing accurate information about the plant. Location finger printing can be enhanced by including additional beaconing devices on the plant floor. These access points can be configured with symbolic and physical information to assist in more accurately locating assets on the plant floor. More integrated systems can include map based positioning systems that are combined to create an overall plant positioning systems. Databases such as SQL Server 2008 provide support for supporting such a system.

Figure 3:
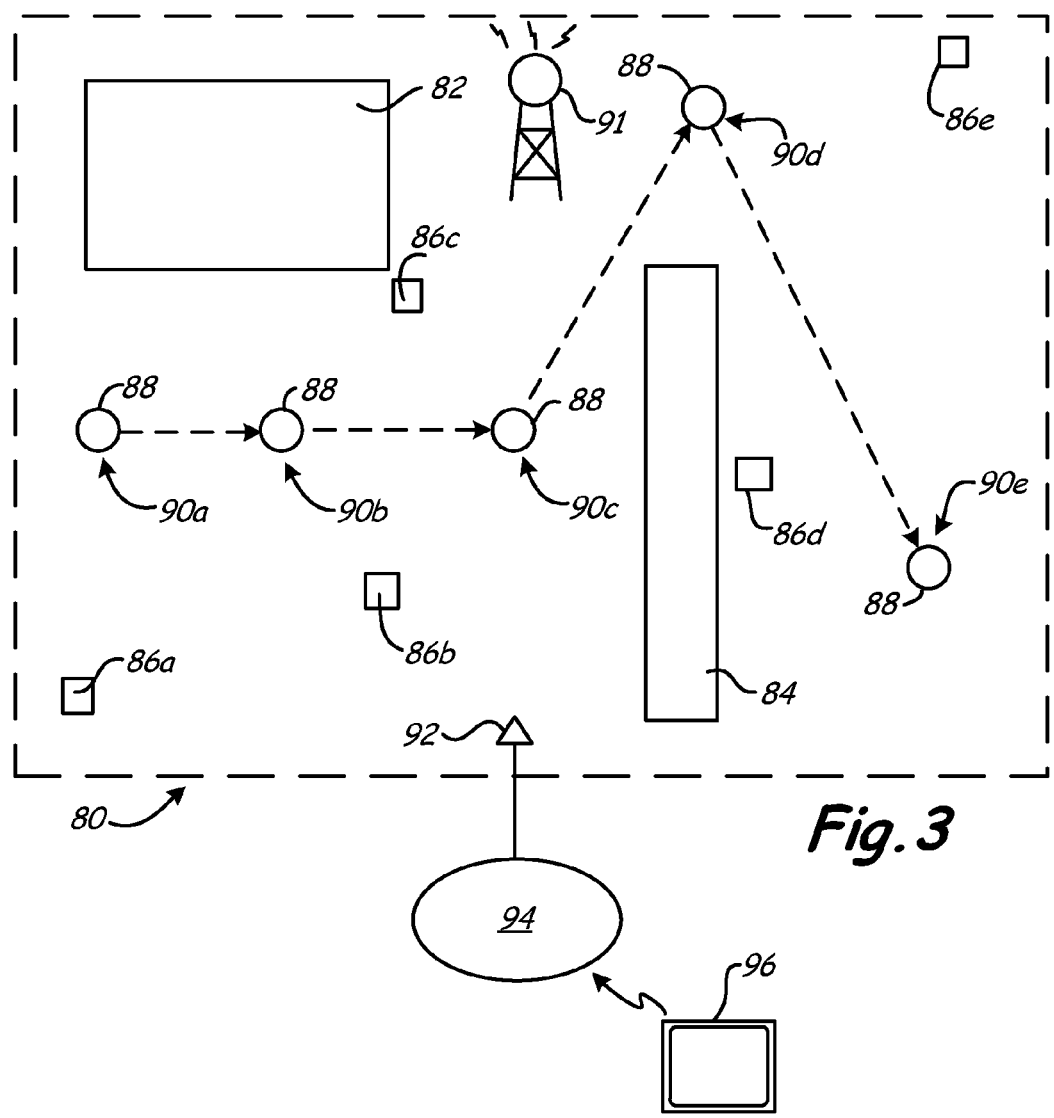
FIG. 3 is a diagram of a room depicting exemplary locations of nodes in the wireless mesh network.

Positioning information can be determined to provide location awareness with existing wireless sensor mesh networks deployed in process plants without additional hardware support. Two methods to do this include triangulation and finger printing. Triangulation techniques are not always precise in a plant environment due to obstacles, reflections and multipath propagation delays. For example, in FIG. 3, exemplary plant 80 contains machines 82 and 84 which obstruct wireless communication. Plant equipment is often constructed of metals that interfere with electro-magnetic signals such as wireless communications. Weaker signals do not necessarily imply longer distances which may affect multipath propagation communication models. Finger printing methods use training data to identify certain locations in the plant and then later look for the closest known point to measured values. One method of the present invention to accomplish location determination is to utilize finger printing with a training mode and a database of distance measurements and positional information.

Plant 80 has a plurality of installed and fixed nodes 86a-86e (collectively referred to as nodes 86) dispersed around machines 82 and 84. An engineer takes mobile node 88 (in some cases a handheld) to a plurality of interested locations 90a-90e (collectively referred to as interested locations 90). Interested locations 90 may be only important locations or they may be each coordinate grid point in plant 80 at different granularities. At each interested locations 90, mobile node 88 measures the distance from all nodes 46 in range and report that to the network manager along with positional information about the interested location. A network manager can be implemented in a number of ways including as an application running on a gateway such as gateway 92 to network 94. The distance measurement may be accomplished by a variety of techniques including triangulation, received signal strength (RSSI), or the previously described calibration count modified time of flight calculations.

Alternatively, nodes 86 measure the distance from mobile node 88 and nodes 86 report that to the network manager with the positional information. In another alternative embodiment, both mobile node 88 and nodes 86 measure and report their respective distances to the network manager. The network manager compares the measurements from mobile node 88 to those reported by nodes 86 and stores only those which are sufficiently close to each other to ensure reliable and accurate information stored in the database. The network manager may also compare the newly measured information to that which may already be recorded in the database and only update it if it is within one standard deviation of the average. In this way, the quality and reliability of the stored data points are increased. Another embodiment includes the presence of both fixed and mobile nodes in the wireless mesh network and either the network manager or nodes 86 or 88 filter the received signal strength information such that only those measurements from fixed nodes are saved in the database.

In all described embodiments, a GPS device may be connected to mobile node 88 to provide a more accurate description of interested location 90 where the received signal strength measurements are made. Because plant 80 is often an enclosed structure with limited GPS reception, GPS repeater 91 may be installed temporarily or permanently to aid in the configuration of the database.

Location information can be used in any number of ways including distribution to network 94 which may include terminal 96 used as a graphical interface to display a graphical representation (or map) of the position of known nodes. Terminal 96 may also be configured to keep track of all known nodes and incorporate intrustion detection by detecting the presence of an object within an area defined by the range of the wireless mesh network which is not a known node and raising an alarm. This object detection can be accomplished by a variety of techniques including the use of motion detectors, heat sensitive cameras, proximity detectors, etc. The object detection can also be determined based on the deviation of received signal strengths or distance measurements from those stored in the database between the known nodes with fixed locations in the network.

Once the database is populated with positional information and relative distance information, the location of a node can later be determined by measuring adjacent node distances and comparing it to the database. The later node can either be the same mobile node used to configure the system or any of a plurality of nodes that can enter or leave the range of the wireless mesh network. This is done by searching the database for a set of distance vectors which most closely match those currently reported from the node.

Several database lookup methods are possible including a neural network approach and a least squares approach. For illustrative purposes, a least squares approach is described. An anchor node can be any node with a fixed location that was used in the training process. To perform a search with N anchor nodes in a mesh, first the distance measurements from a mobile node M to anchor node i (for i=1 to N) are collected and referred to as SMi. The database already contains a list of distance values for pre-stored interested locations L to the anchor nodes now referred to as SLi (for i=1 to N). If necessary, a logarithm function is applied to the distance values so that the resulting value is close to linear to the physical distance between the sender and receiver. This is particularly useful in the case of RSSI values where signal strength is not linearly related to distance. M and L are treated as two points in a N-dimensional space with each axis representing an anchor node. The geometric distance between M and L in this space is given by the square root of $\Sigma^{N}_{i=1}(\log(SLi)-\log(SMi))^2$. Among all the interested locations, the one with the smallest square root value is the closest interested location stored in the database to the present position of node M resulting in a location determination for node M.

Figure 4:
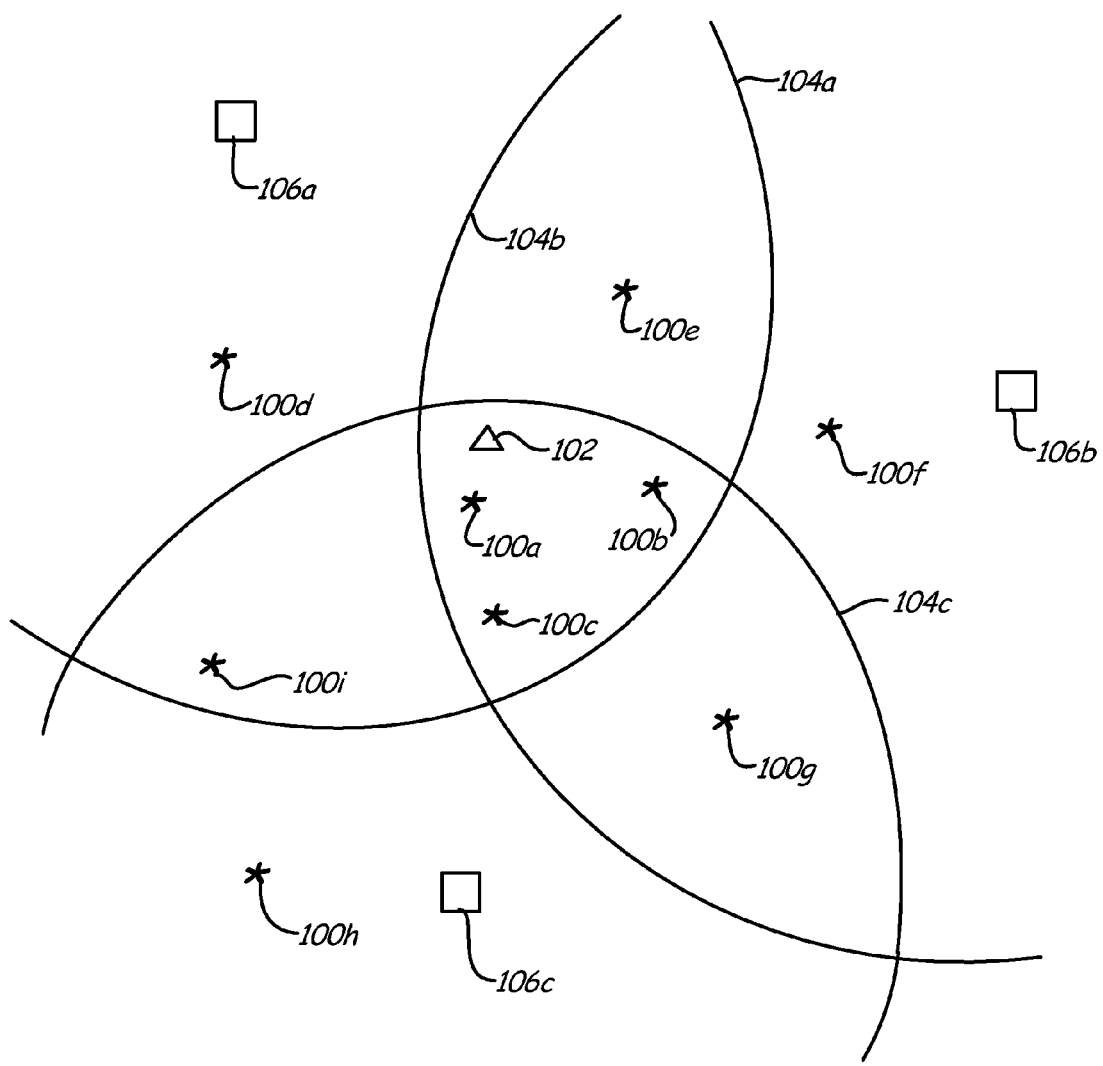
FIG. 4 is a diagram of distance measurements to neighboring nodes which can be used to narrow the possible locations of another node.

Given enough nodes, it is possible that two distant locations have similar relative distance values due to varying path propagation. Likewise, two close locations may have very different distance values. Referring now to FIG. 4, interested locations 100a-100f (collectively interested locations 100) are stored in the database and dispersed within a plant that includes fixed location node 102. Distance measurements from node 102 result in the distances illustrated by arcs 104a-104c. Node 106a calculates a distance which places node 102 on arc 104a. Node 106b calculates a distance which places node 102 on arc 104b. Node 106c calculates a distance which places node 102 on arc 104c. Because of measurement error, this does not yield a specific location, but rather a region which encompasses interested locations 100a, 100b, and 100c. These interested locations create a subset of the database to search. Only the distance information in the database associated with interested locations 100a, 100b, and 100c, need to be evaluated. The result is that node 102 is determined to be closest to interested location 100a quickly and reliably.

Although the present invention has been described with reference to preferred embodiments, workers skilled in the art will recognize that changes may be made in form and detail without departing from the spirit and scope of the invention.

The invention claimed is:

1. A method for locating a node within a wireless mesh network comprising:
   measuring, by a first node, a first calibration count multiplier based upon an error in count value over a given time period;
   measuring, by a second node, a second calibration count multiplier based upon an error in count value over a given time period;
   transmitting a first message by the first node;
   receiving the first message by the second node;
   transmitting a second message by the second node;
   receiving the second message by the first node;
   measuring a first elapsed time from a beginning of transmitting the first message to a beginning of receiving the second message;
   measuring a second elapsed time from a beginning of receiving the first message to a beginning of transmitting the second message;
   transmitting a third message by the second node containing the second elapsed time;
   receiving the third message by the first node; and
   calculating a distance between the first and second nodes based upon the first and second elapsed times and the first and second calibration count multipliers;
   wherein the second calibration count multiplier is contained in either the second or third message.

2. The method of claim 1 wherein measuring a first elapsed time from a beginning of transmitting the first message to a beginning of receiving the second message further comprises:
   recording a first timestamp at the beginning of transmitting the first message;
   recording a second timestamp at the beginning of receiving the second message; and
   calculating the first elapsed time by subtracting the first timestamp from the second timestamp.

3. The method of claim 1 wherein measuring a second elapsed time from a beginning of receiving the first message to a beginning of transmitting the second message further comprises:
   recording a first timestamp at the beginning of receiving the first message;
   recording a second timestamp at the beginning of transmitting the second message; and
   calculating the second elapsed time by subtracting the first timestamp from the second timestamp.

4. The method of claim 1 wherein measuring a first elapsed time from a beginning of transmitting the first message to a beginning of receiving the second message further comprises:
   starting a counter at the beginning of transmitting the first message; and
   reading the counter at the beginning of receiving the second message to determine the first elapsed time.

5. The method of claim 1 measuring a second elapsed time from a beginning of receiving the first message to a beginning of transmitting the second message further comprises:
   starting a counter at the beginning of receiving the first message; and
   reading the counter at the beginning of transmitting the second message to determine the second elapsed time.

6. The method of claim 1 wherein the first and second elapsed times have a resolution of at least 1 nanosecond.

7. The method of claim 1 wherein the first and second elapsed times have a resolution of approximately 10 nanoseconds.

8. The method of claim 1 wherein the first and second elapsed times have a resolution of approximately 20 nanoseconds.

9. The method of claim 1 further comprising:
   determining a distance between the first node and a third node; and
   calculating a position of the first node in two dimensions based upon the distance between the first and second nodes and the distance between the first and third nodes.

10. The method of claim 9 further comprising:
    reporting the position of the first node to a network manager; and
    maintaining, by the network manager, a map including the position of the first node.

11. The method of claim 10 further comprising:
    displaying the map on a graphical interface.

12. The method of claim 10 further comprising:
    maintaining a position of all known nodes within an area defined by the map;
    detecting an object within the area; and raising an alarm if the object is not a known node within the area.

13. The method of claim 1 further comprising:
determining a distance between the first node and a third node;
determining a distance between the first node and a fourth node; and
calculating a position of the first node in three dimensions based upon the distance between the first and second nodes, the distance between the first and third nodes, and the distance between the first and fourth nodes.

14. The method of claim 13 further comprising:
reporting the position of the first node to a network manager; and
maintaining, by the network manager, a map including the position of the first node.

15. The method of claim 14 further comprising:
displaying the map on a graphical interface.

16. The method of claim 15 further comprising:
maintaining a position of all known nodes within an area defined by the map;
detecting an object within the area; and
raising an alarm if the object is not a known node within the area.

17. A method for locating a node within a wireless mesh network comprising:
positioning a node in more than one location within the wireless mesh network;
determining, for each location, positional information about the node;
exchanging calibration count multipliers between the node and a plurality of nodes installed in the wireless network, wherein the calibration count multipliers are based upon errors in count value over a given time period;
measuring a first plurality of distances from the plurality of nodes to the node at each location using a time of flight measurement and the calibration count multipliers;
transmitting the first plurality of distances and the positional information about the node for each location to a network manager; and
storing, by the network manager, the first plurality of distances and the positional information for each location.

18. The method of claim 17 wherein storing, by the network manager, the first plurality of distances and the positional information for each location further comprises filtering the first plurality of distances and storing only those associated with a fixed node.

19. The method of claim 17 wherein storing, by the network manager, the first plurality of distances and the positional information for each location further comprises comparing the first plurality of distances to a set of previously stored plurality of distances and storing only those within one standard deviation of the set of previously stored plurality of distances.

20. The method of claim 17 wherein transmitting the first plurality of distances and the positional information about the node for each location to a network manager further comprises filtering the first plurality of distances and transmitting only those associated with a fixed node.

21. The method of claim 17 wherein at least one of the plurality of nodes is a locator beacon.

22. The method of claim 17 wherein the node is a mobile node.

23. The method of claim 17 wherein measuring a first plurality of distances from a plurality of nodes installed in the wireless mesh network to the node at each location comprises using a time of flight measurement and a calibration count multiplier to calculate the first plurality of distances.

24. The method of claim 17 wherein determining, for each location, positional information about the node further comprises obtaining a GPS measurement of a position of the node.

25. The method of claim 24 wherein determining, for each location, positional information about the node further comprises using a GPS repeater installed near the wireless mesh network to increase a signal strength of the GPS measurement.

26. The method of claim 17 further comprising:
positioning the node within the wireless mesh network;
measuring a second plurality of distances from the plurality of nodes installed in the wireless mesh network to the node;
transmitting the second plurality of distances to the network manager;
determining a location of the node based on the second plurality of distances and the stored first plurality of distances and positional information.

27. The method of claim 17 further comprising:
positioning a second node within the wireless mesh network;
measuring a second plurality of distances from the plurality of nodes installed in the wireless mesh network to the second node;
transmitting the second plurality of distances to the network manager;
determining a location of the second node based on the second plurality of distances and the stored first plurality of distances and positional information.

28. The method of claim 27 wherein measuring a second plurality of distances from the plurality of nodes installed in the wireless mesh network to the second node further comprises using a time of flight measurement and a calibration count multiplier to calculate the second plurality of distances.

29. The method of claim 27 wherein determining a location of the second node based on the second plurality of distances and the stored first plurality of distances and positional information further comprises triangulating a region based upon the second plurality of distances and searching only the stored first plurality of distances and positional information located in the region.

30. The method of claim 27 wherein determining a location of the second node based on the second plurality of distances and the stored first plurality of distances and positional information further comprises searching the stored first plurality of distances and positional information using a least squares algorithm.

31. The method of claim 27 wherein determining a location of the second node based on the second plurality of distances and the stored first plurality of distances and positional information further comprises searching the stored first plurality of distances and positional information using a neural network algorithm.

32. The method of claim 27 further comprising: displaying a graphical representation of the location of the second node.

33. The method of claim 27 further comprising:
maintaining a status of a position of all known nodes in the wireless mesh network;
detecting a position of an object within a region of coverage of the wireless mesh network; and
raising an alarm if the position of the object is not a known node in the wireless mesh network.

* * * * *